(12) United States Patent
Lyon

(10) Patent No.: US 12,527,559 B2
(45) Date of Patent: Jan. 20, 2026

(54) THERMAL-MODULATION PROBE DEVICE FOR MAMMALIAN PELVIC CAVITIES AND METHOD OF APPLIED THERMAL THERAPY

(71) Applicant: Zachary Wood Lyon, Lewisville, NC (US)

(72) Inventor: Zachary Wood Lyon, Lewisville, NC (US)

( * ) Notice: Subject to any disclaimer, the term of this patent is extended or adjusted under 35 U.S.C. 154(b) by 514 days.

(21) Appl. No.: 18/085,180

(22) Filed: Dec. 20, 2022

(65) Prior Publication Data
US 2023/0248342 A1    Aug. 10, 2023

Related U.S. Application Data

(60) Provisional application No. 63/361,405, filed on Dec. 20, 2021.

(51) Int. Cl.
*A61B 17/00* (2006.01)
(52) U.S. Cl.
CPC .............. *A61B 17/00234* (2013.01); *A61B 2017/00084* (2013.01)

(58) Field of Classification Search
CPC .... A61B 17/00234; A61B 2017/00084; A61B 2018/00005; A61F 2007/005; A61F 2007/0086; A61F 7/007; A61F 7/12
See application file for complete search history.

(56) References Cited

U.S. PATENT DOCUMENTS

| | | | |
|---|---|---|---|
| 2005/0240249 A1* | 10/2005 | Tu | A61B 18/1492 607/113 |
| 2014/0088463 A1* | 3/2014 | Wolf | A61B 18/1477 606/199 |
| 2022/0104695 A1* | 4/2022 | Russell | A61B 1/00006 |

* cited by examiner

*Primary Examiner* — Tigist S Demie

(57) ABSTRACT

A device for providing mammalian pelvic cavitary contrast therapy is presented. The system may comprise a human interface device, fluid tubing, a pump, and a reservoir. The system may be operable to apply any combination of heat or cold thermal energy transfer. The system may be operable to impart a desired therapy temperature to the human interface device and to expand a membrane containing a therapy fluid. The expanded membrane may conform to the contours of a therapy site. Operation of the human interface device may be controlled using a remote-control device. The therapy recipient is able to control the temperature of the fluid circulating through the membrane and is able to control the pressure of the fluid within the membrane.

15 Claims, 11 Drawing Sheets

11

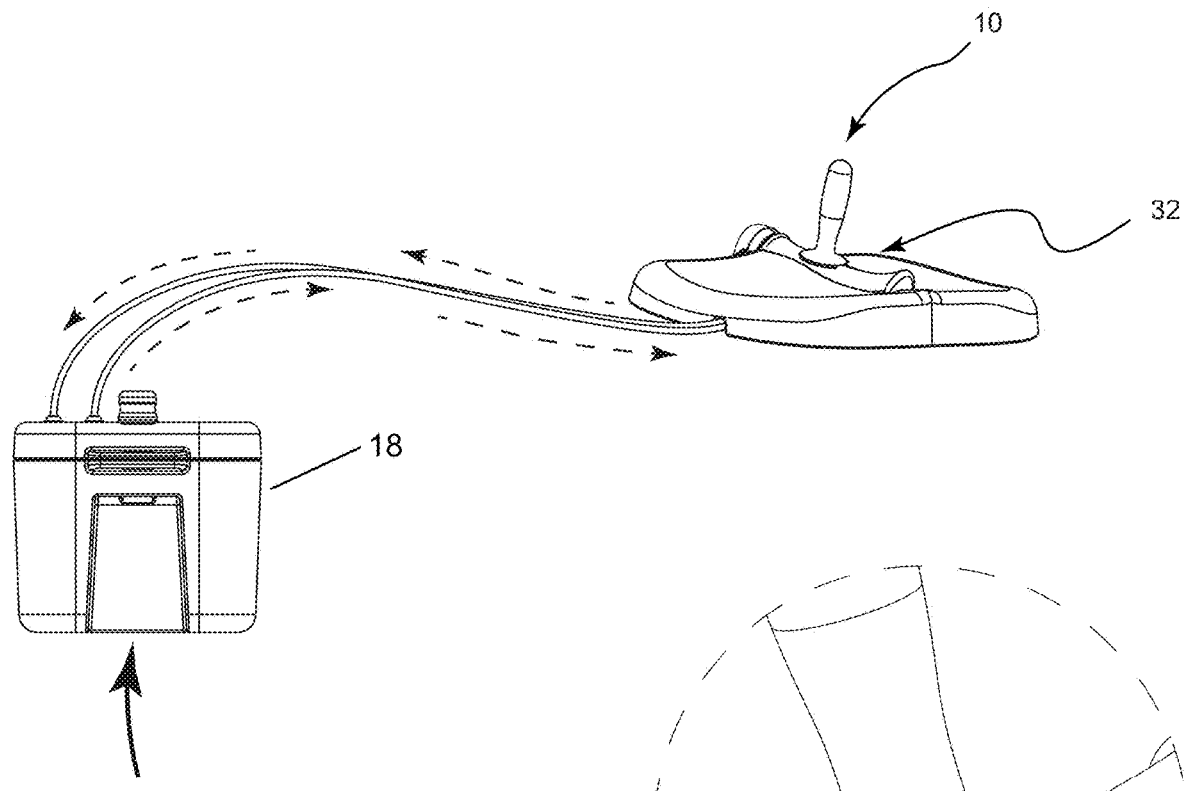
FIG. 3a
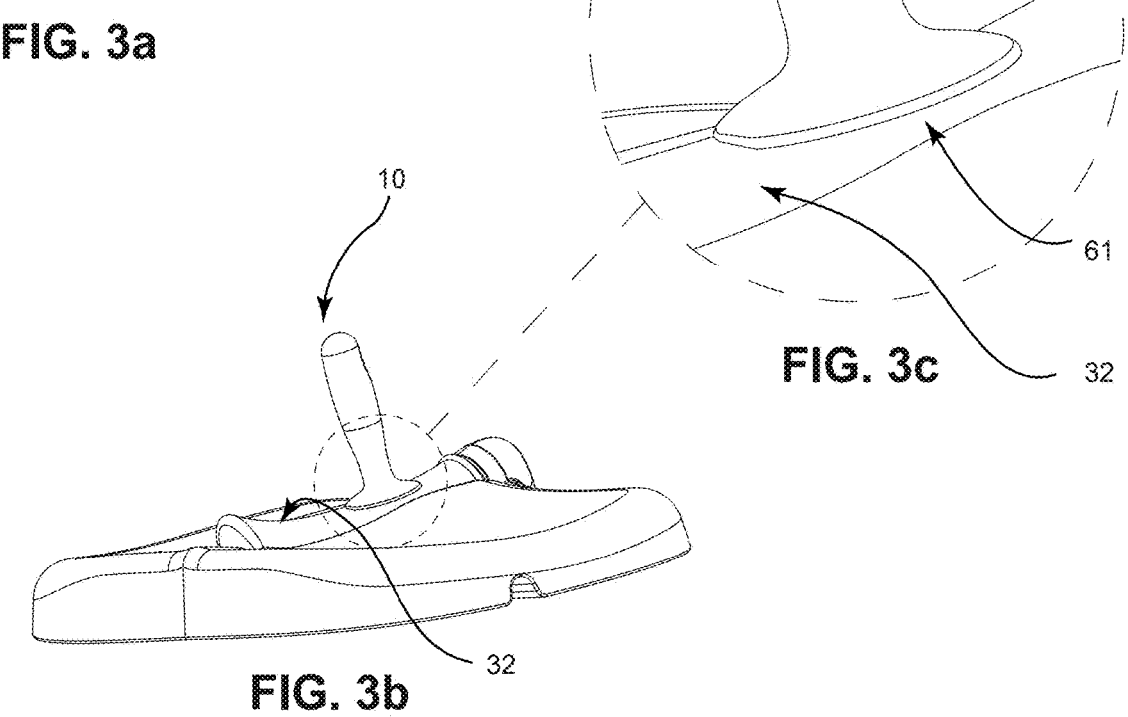
FIG. 3b
FIG. 3c

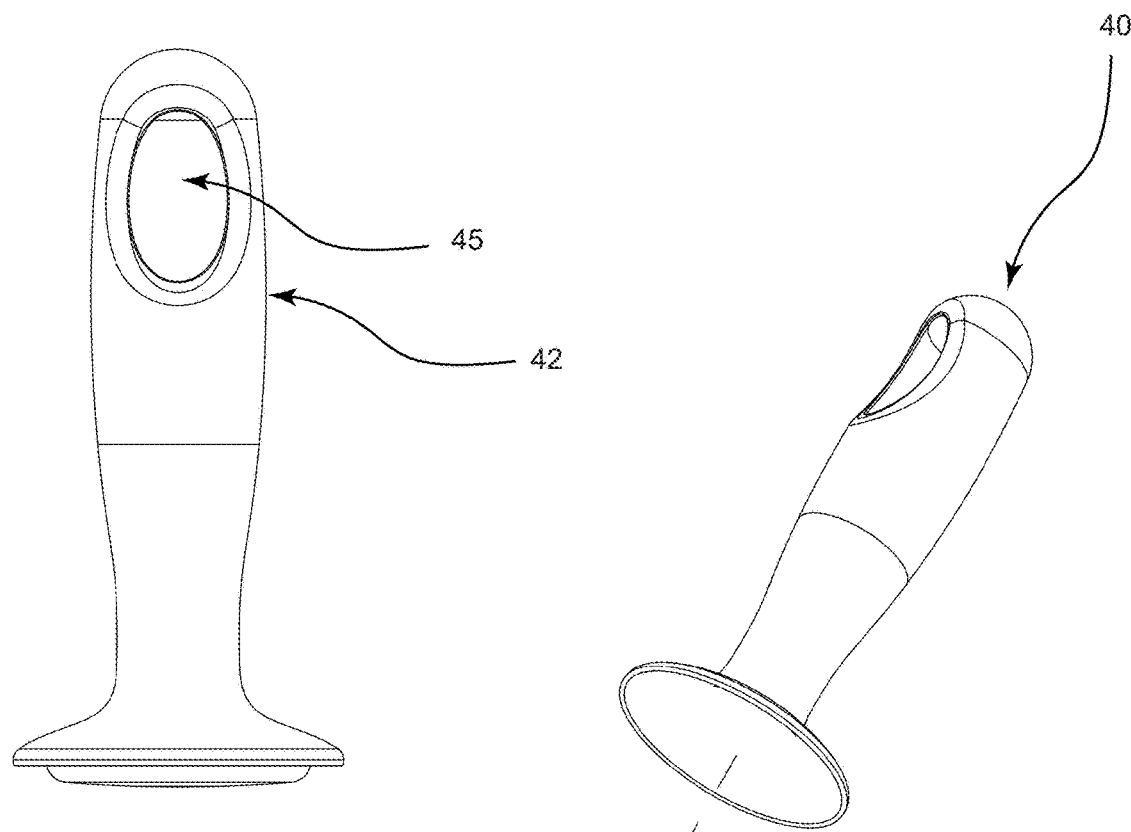
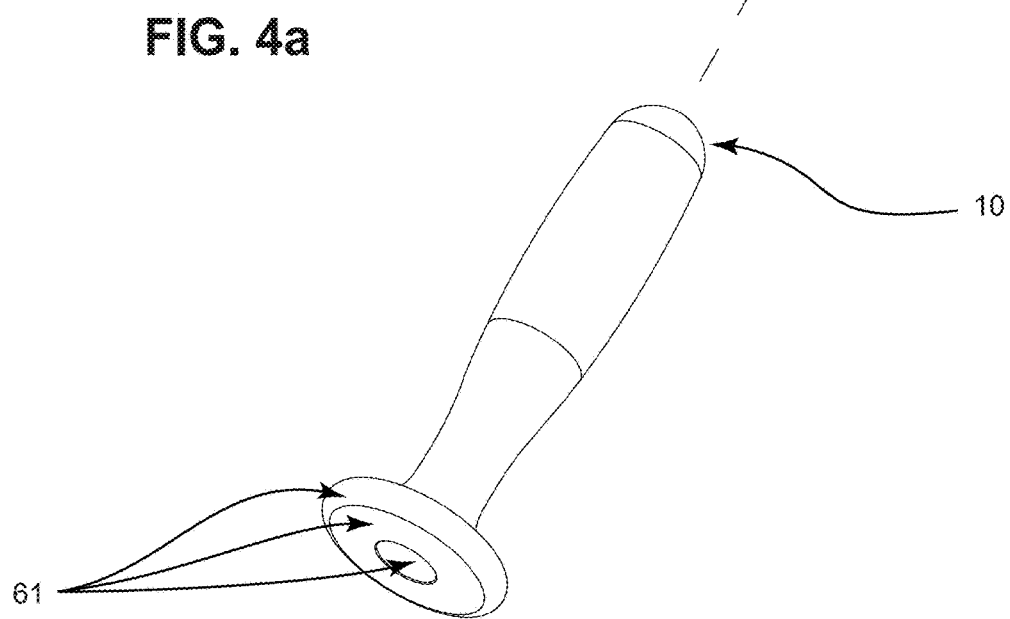
FIG. 4a
FIG. 4b

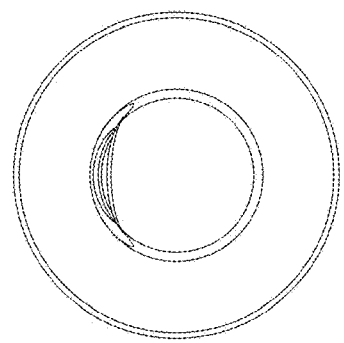
FIG. 5b
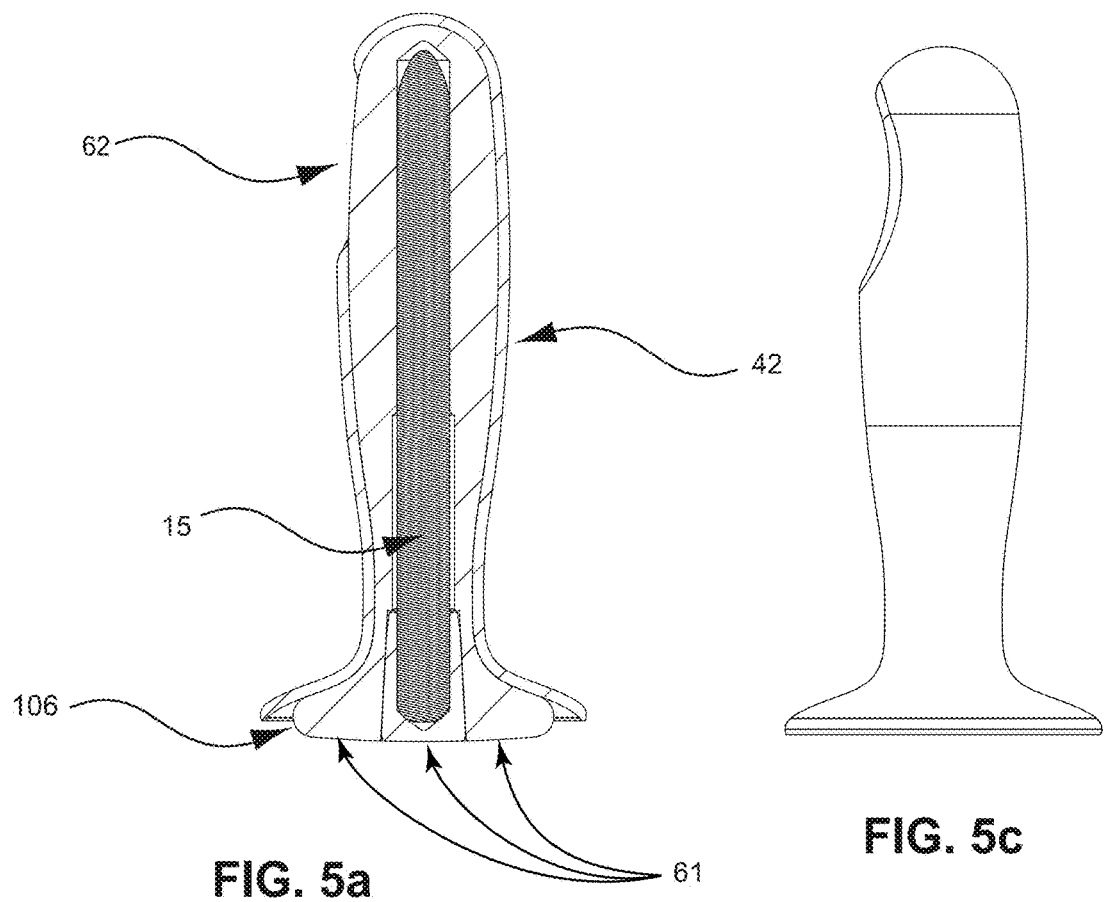
FIG. 5a
FIG. 5c
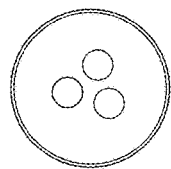
FIG. 5e
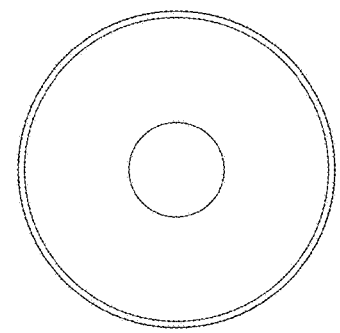
FIG. 5d

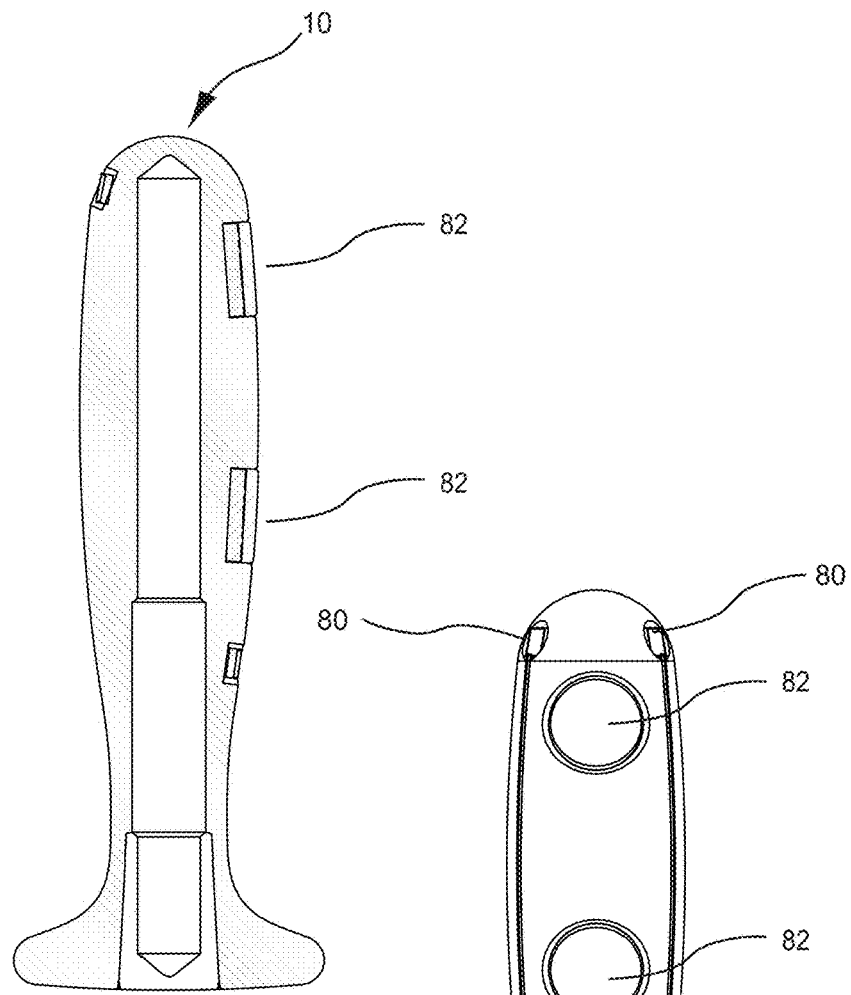
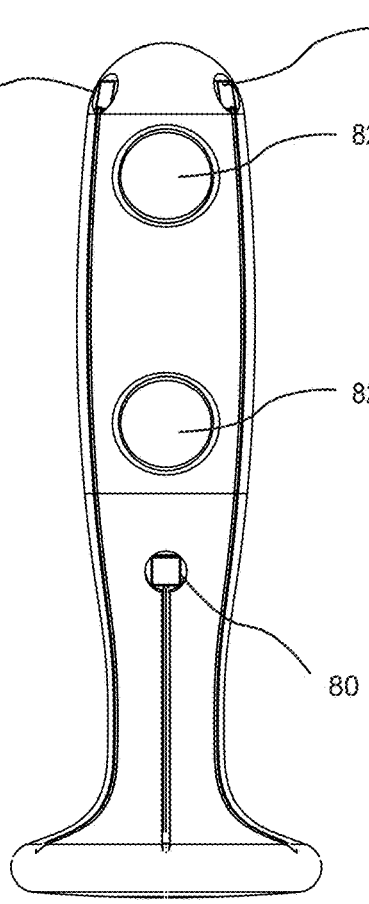
FIG. 8b
FIG. 8c
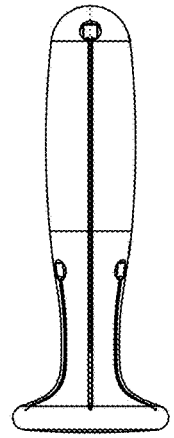
FIG. 8a

THERMAL-MODULATION PROBE DEVICE FOR MAMMALIAN PELVIC CAVITIES AND METHOD OF APPLIED THERMAL THERAPY

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

CROSS-REFERENCE TO RELATED APPLICATIONS

This application claims the benefit of U.S. Provisional Application No. 63/361,405, filed on Dec. 20, 2021, and entitled "Thermal-Modulation Probe Device for Mammalian Pelvic Cavities and Method of Applied Thermal Therapy," which is included herein in its entirety.

FIELD OF THE INVENTION

The present invention relates to physical therapy thermal contrasting systems. In particular, the invention applications may be to focus energy into anal, prostate, vaginal, uterine, bladder, and organs and systems that are locoregional to the rectal and vaginal cavities as a method to induce an improved or upregulated health response utilizing Thermal-Modulation methods.

BACKGROUND

The subject matter herein relates generally to Anal-Perineal-Prostate-Vaginal-Pelvic Floor therapy and related devices.

Internal pelvic pain-inducing conditions have plagued humans from time immemorial, particularly adult humans. Internal pelvic pain-inducing conditions are at times excruciatingly painful, swelling, itching, stabbing, stinging, tugging, bloating sensations that may be resulting from inflammation caused by a various number of pelvic pain-inducing maladies or disease states of the anal cavity, rectum, vaginal canal. Additionally, the bladder is also known to create some of the most painful conditions of the internal pelvic regions. Some conditions may be simply varicose veins in the anal canal, such as internal or external hemorrhoids. Yet other more challenging to reach and treat regions may comprise pelvic inflammatory disease (PID) or prostate pain (PP) or interstitial cystitis (IC) that results in burning/stinging/constant urinary urges of the bladder or in some cases more complex anal fissures, fistulas and ulcers as is seen in Irritable Bowl Disorder (IBD) or "Chrons" disease. Many treatments have been devised over the years, including chemical, thermal, electrical, thermal-electric, and surgical. Some treatments involve elaborate surgical procedures and, at times somewhat drastic outcomes having damaging or life altering side effects. Many of the prior art techniques of remediation may require administration by trained technicians or, in some cases, physicians.

Internal pelvic pain-inducing conditions may reside locoregional to the lower rectal tract, the prostate gland, intravaginally and in proximity to the vaginal canal. Some of these conditions may be related to cancerous or tumor-like conditions that are becoming chronic and refractory to present methods of treatment or therapy.

The primary complications of internal pelvic pain-inducing conditions may be bleeding, ulcers, neurotic inflammation, fissures or tears, varicosities, tumors, growths, strangulation and thrombosis. As an example, patients with interstitial cystitis/painful bladder syndrome (IC/PBS) may suffer debilitating unrelenting burning, stinging or throbbing and nocturia sensations.

Anal pain-inducing conditions may come in the form of internal ulcers, fissures and during defecation and spontaneously return. Prolapsed inflamed rectal mucosa tissues may have to be manually returned by the patient or they may remain stubbornly prolapsed.

For piles or thrombosed hemorrhoids, the treatment methods range from warm baths through ointments and suppositories to surgery or injection chemotherapy to control the bleeding and to eliminate the varicose veins. Often several methods are combined to address various aspects of the etiology of any of the above disease states.

Medical therapies, used only for small Internal pelvic pain-inducing conditions associated with mild symptoms, includes reducing pressure by treating the constipation and thus keeping the stools soft. Pain is relieved with sitz baths, application of heat with electric pads or water bottles, and astringent lotions, such as witch hazel. A recumbent position may be needed if the hemorrhoid is prolapsed or thrombosed.

Experts believe that more than 30% of the population have, at any given time, some form of internal pelvic pain-inducing malady or condition. These maladies and conditions may encompass no less than twenty-plus known etiologies such as vulvodynia, pelvic inflammatory disease, interstitial cystitis, vestibulodynia, prostatitis, rectal cancer, vaginal cancer (leiomyosarcomas), candida over blooms, etc. In a review of the records of 23,446 patients with Internal pelvic pain-inducing conditions, it was found that 80% of the patients were between the ages of 20 and 60 years.

In a non-limiting example, the anus, the opening at the lower part of the rectum through which bowel movement pass from the body, is warm, moist, and richly endowed with sensory nerve receptors. These nerve endings register feelings of itchiness when they are mildly stimulated and feelings of pain when the irritation from inflammation is more intense. Thus, anal itching is often interspersed with pain. These same types of nerve aggravations may be also observed in the vaginal exterior to the luminal channel.

Because a preponderance of pain is derived from inflamed conditions, commercial suppositories and ointments may have a brief effect, but no overall long-lasting remedial action to internal pelvic pain-inducing conditions.

BRIEF DESCRIPTION OF THE DRAWINGS

Certain illustrative embodiments illustrating organization and method of operation, together with objects and advantages, may be best understood by reference to the detailed description that follows taken in conjunction with the accompanying drawings in which:

FIG. 3a is a view of the pelvic cavity thermal probe delivery device illustrating an embodiment of the therapy device while in use in accordance with an embodiment of the present invention.

FIG. 3b is a side view of the probe element of the pelvic cavity thermal probe delivery device in accordance with an embodiment of the present invention.

FIG. 3c is a close-up view of the probe element of the pelvic cavity thermal probe delivery device in accordance with an embodiment of the present invention.

FIG. 4a is an isolated view of the thermal delivery probe with focus therapy window of insulation sleeve in accordance with an embodiment of the present invention.

FIG. 4b is a detail view of an embodiment of the exploded view of sleeve and thermal delivery probe in accordance with an embodiment of the present invention.

FIG. 5a is a detail view of an embodiment of the section of the thermal delivery probe with focus therapy window of insulation sleeve in accordance with an embodiment of the present invention.

FIG. 5b is a detail view of an embodiment of the top view of the thermal delivery probe with focus therapy window of insulation sleeve in accordance with an embodiment of the present invention.

FIG. 5c is a detail view of an embodiment of side view the thermal insulation sleeve in accordance with an embodiment of the present invention.

FIG. 5d is a detail view of an embodiment of the bottom inside view the thermal insulation sleeve in accordance with an embodiment of the present invention.

FIG. 5e is a detail view of an embodiment of the bottom inside view the thermal insulation sleeve in accordance with an embodiment of the present invention.

FIG. 8a presents the application of at least one sensor type as applied to the pelvic cavity thermal probe in accordance with an embodiment of the present invention.

FIG. 8b presents a section view of the pelvic cavity thermal probe depicting a combination of miniature WiFi transmitter/receiver and power source and related subsurface mounted sensors in accordance with an embodiment of the present invention.

FIGURE 8c presents a front view of application of thermal sensor types and addition of tissue depth radiometry sensors and direct thermal surface sensing in accordance with an embodiment of the present invention.

DETAILED DESCRIPTION

Figure 1A:
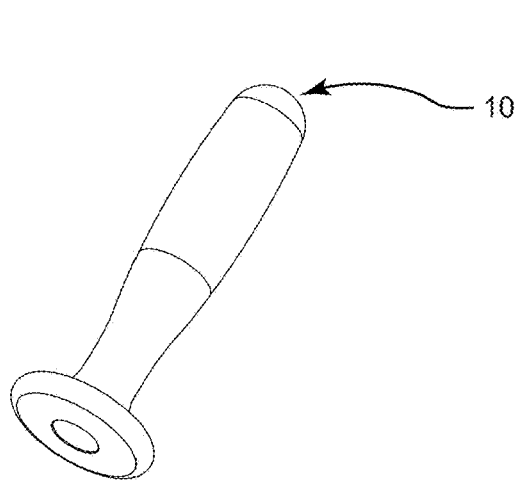
FIG. 1a is an example of a pelvic cavity thermal probe delivery device in accordance with an embodiment of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "AC/DC converter" is an electrical device that converts an AC voltage into a regulated DC voltage. As non-limiting examples, a common type of AC/DC converter may convert an input of 120 VAC to an output of 5 to 24 VDC for use in powering and/or recharging portable equipment such as smartphones, tablet computers, laptop computers, portable DVD players, and calculators.

As used herein, "ambient environment" refers to the natural environment surrounding the invention.

As used in this disclosure, an "aperture" is an opening in a surface. Aperture may be synonymous with hole, slit, crack, gap, slot, or opening.

As used herein, "approximate" and "approximately" indicate that information that is being presented is not critical for proper functioning of the invention and that the information is being provided only to assist in a better understanding of some physical characteristic of an embodiment of the invention. As a non-limiting example, a device that is described as "cubical and approximately 1 inch long on each side" is not required to be precisely 1 inch long on each side and the reader may understand that the device will likely fit in their pocket.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "cavity" is an empty space or negative space that is formed within an object.

In this disclosure, "compress" refers to forcing into a smaller space.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used in this disclosure, a "control system" is a first device or system that manages and regulates the behavior or operation of a second device or system.

As used in this disclosure, the word "correspond" indicates that a first object is in some manner linked to a second object in a one-to-one relationship or that one or more properties shared by two or more objects match, agree, or align within acceptable manufacturing tolerances.

As used herein, the words "couple", "couples", "coupled" or "coupling", refer to connecting, either directly or indirectly, and does not necessarily imply a mechanical connection.

As used herein, the word "desired" refers to a specific value or action within a range of supported values or action. A "desired" value or action indicates that a range of values or actions is enabled by the invention and that a user of the invention may select a specific value or action within the supported range of values or action based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, "elastic" refers to a material or object that deforms when a force is applied to stretch or compress the material and that returns to its relaxed shape after the force is removed. A material that exhibits these qualities is also referred to as an elastomeric material.

As used herein, "elastomeric polyurethane" refers to a class of polyurethane material that has the characteristics of rubber. Being a polyurethane, it is a polymer derived from the reaction between a molecule with an isocyanate (R—N═C═O) functional group and a molecule with multiple alcohol groups (R—OH), called a polyol. The choice of isocyanate and polyol are what makes one polyurethane elastomeric rather than another type of polyurethane.

As used herein, "energize" and/or "energization" refer to the application of an electrical potential to a system or subsystem.

As used herein, "filling", or "refilling", refers to the act of placing a first item into a second item whether the quantity of the first item fills the second item or not. As non-limiting examples, the first item may be a liquid, such as water or gasoline, or a granulated solid, such as sand or coffee beans. As non-limiting examples, the second item may be a bin, a bottle, a tank, or another type of container.

As used in this disclosure, "flexible" refers to an object or material which will deform when a force is applied to it, which will not return to its original shape when the deforming force is removed, and which may not retain the deformed shape caused by the deforming force.

As used herein, "front" indicates the side of an object that is closest to a forward direction of travel under normal use of the object or the side or part of an object that normally presents itself to view or that is normally used first. "Rear" or "back" refers to the side that is opposite the front.

As used herein, the words "invert", "inverted", or "inversion" refer to an object that has been turned inside out or upside down or to the act of turning an object inside out or upside down.

As used herein, "mate" refers to a retaining, coupling, connecting, interlocking, or interfacing at a predefined interface.

As used herein, "pair", "paired", and "pairing" refer to a connection established between two wireless devices or to the process of establishing such a connection.

As used in this disclosure, a "pump" is a mechanical or electromechanical device that uses suction or pressure to raise or move fluids, compress fluids, or force a fluid into an inflatable object. As non-limiting examples, fluids may include both liquids, such as water, and gases, such as air.

As used in this disclosure, "remote control" refers to the establishment of control of a device from a distance or to the controlling device itself. Remote-control is generally accomplished through the use of an electrical device that generates electrically based control signals that are transmitted via radio frequencies to the device. Some remote controls may use infrared light to communicate with a device.

As used in this disclosure, a "reservoir" refers to a container or containment system that is configured to store a liquid, gas, or gel.

As used herein, "smart device" refers to a portable electrical device comprising at least a processor, display, input device, and network connection. The input device is generally a touch screen, keyboard, or voice recognition. The network connection is generally wireless. Non-limiting examples of smart devices may include smartphones, tablets, personal digital assistants, laptop computers, and smartwatches.

As used herein, a "tablet computer" or "tablet" refers to a mobile computing device packaged as a single, monolithic unit—similar in appearance to a paper tablet. Typically, tablet computers have a touch sensitive, flat video display covering most of the front surface and do not have a keyboard; although many tablet computers may be mated with a separate keyboard accessory. Tablet computers generally comprise one or more microprocessors, memory, and a rechargeable battery internal to the tablet. Most tablet computers comprise a wireless network connection, typically via a WiFi interface. Many tablet computers comprise an internal camera, microphone, and one or more audio speakers. Interaction between the user and a tablet computer is generally via the touch screen using a stylus or fingers and may involve the use of 'gestures' which are specific motions on the touch screen which are interpreted by the tablet computer to magnify or shrink the display, open, close, or switch between applications, scroll, or perform other tablet computer functions.

As used in this disclosure, "therapeutic" is an adjective that refers to a medical, ameliorative, or hygienic substance, process, or procedure.

As used in this disclosure, a "tube" or "tubing" refers to a hollow cylindrical device that is used for transporting liquids and/or gases. In this disclosure, the terms inner diameter and outer diameter are used as they would be used by those skilled in the plumbing arts. The line that connects the center of the first base of the cylinder to the center of the second base of the cylinder and is equidistant from the outer surface of the tube for its entire length is referred to as the centerline of the tube. When two tubes share the same centerline, they are said to be aligned. When the centerlines of two tubes are perpendicular to each other, the tubes are said to be perpendicular to each other. As used here, "tubing" refers to a tube that is flexible or resilient.

As used in this disclosure, a "valve" is a device that is used to control the flow of a fluid, either gas or liquid, through a pipe or to control the flow of a fluid into and out of a container. Some valves may have multiple ports and may allow the diverting or mixing of fluids.

As used in this disclosure, "wireless" is an adjective that is used to describe a communication channel that does not require the use of physical cabling.

There has been a long-recognized need for simple, inexpensive, non-toxic, self-administered devices or procedures that have no harmful side effects or after-effects of indicated therapy. Although several attempts have been made to resolve these conditions with simple means, heretofore none of these have been entirely satisfactory for one or more reasons.

The prostate gland is located below a man's urinary bladder. The prostate gland is connected by the urethra, which is a tube that starts at the urinary bladder and goes through the middle of the prostate gland and carries urine out through the penis. As some men grow older, the prostate tissue surrounding the urethra grows in size and constricts the flow of urine from the urinary bladder to the penis, as this can cause a man extreme pain and discomfort. It has been shown that inflamed prostates due to cancer may have an increase of TRPM8 Ionic channel regulators. These TRPM8 ion channels regulate $Ca^{2+}$ homeostasis. Functioning as a cellular sensor and transducer of cold temperatures and are known to be directly impacted by physical cooling to reduce pain and inflammation. Accumulating evidence has demonstrated that TRPM8 is aberrantly expressed in a variety of malignant solid tumors and has shown that overexpression may correlate with tumor progression.

Surgery is one method of attempting to correct the prostate problem. Surgery involves the removal of some of the enlarged tissue from the prostate. Many men prefer to forego surgery and thus elect to endure the pain. There have been some recent claims that experimental drugs appear to be an effective alternative to surgery; many men are reluctant to experiment with said drugs.

Other human pelvic debilitating maladies that cause chronic pain also include interstitial cystitis. This disease at times, may induce a suicidal level of pain-inducing conditions of the bladder due to inflammation and excessive mast cell production. It has also been shown to be associated with an increase of TRPM8 Ionic channel proteins in the bladder, known to be directly impacted by physical cooling to reduce pain and inflammation.

For females, a similar vascular inflammatory condition known as pelvic inflammatory disease is typically diagnosed from evidence of inflamed internal vesicals and veins of the pelvic cavity. This known condition may also be coupled with endometriosis and or vestibulodynia. All of these pain-inducing conditions have roots in uncontrolled inflammation and swelling. Said pain may be treated with medications to treat the effects, yet the root cause is still left unattended.

This invention relates to an improved device and method of therapy, where the unique configuration of the anatomically designed thermal wicking probe provides the means of thermal energy transfer and subsequent pain relief. By imparting cooling influences to affect the reduction of the size of the inflamed tissues or aggravated nociceptors deep pelvically located pain signals are diminished. The device claims to resolve the deficiencies published and practiced by utilizing a device of long duration. Using high levels of control and a thermodynamically coupled probe that uses simple passive contact thermal transfer principles from an external to human body source of constant and controlled energy source.

In another embodiment, the system comprises a probe device of therapy intended specifically for anal and/or vaginal insertion to address related injuries and chronic pain-inducing conditions physically. Injuries from post-medical procedures and related traumas and or disease-related chronic painful disorders. A non-invasive, anal or vaginal cavity-accessible means of managing pain, swelling and improved healing of internal pelvic abnormal conditions that may be related to traumatic events or disease-induced conditions. A device of thermal delivery of improved localized circulatory therapy, an instrument of pain management, swelling reduction and improvement of blood flow, localized higher saturated oxygen levels to improve healing. A device for providing for better comfort and therapy due to the supporting system and method of delivery of controlled and consistent thermal-modulation therapy to localized areas of trauma. A device that utilizes temperature differentials of remotely active heated and cooled influences. Influences supplied by simple thermal conduction via probe device and transference of said radiation to surrounding internal tissue types. A non-invasive device and method of delivering said thermal influences via a system of anal-vaginal-prostate-rectal tissue contacting thermal delivery probe, and in general, better pelvic cavity support of localized focused therapies.

In a non-limiting example, the invention may be applied to an internal cavity, such as the vaginal pelvic cavity, whereas thermal energy is imparted to swollen, irritated, thrombotic and/or highly aggravated tissues known to cause pain in the bladder, or to the mucosal walls of the vaginal cavity, or tumorous conditions. The effectiveness and efficiency of the treatment of these conditions is thereby improved. In a non-limiting example of a therapy method, it is known that applying durable thermal influences of CEM 43C thermal dosage prior to radiation therapy, accelerates and enhances the killing effect of tumors imparted by radiation by making the tumors susceptible to this radiation therapy.

Due to the simple, thermodynamically coupled contact pad, the receiver end of the probe, durations of controlled thermal uptake and distributions of energy enable this device to impart diffusing thermal energy deeper into the surrounding tissues and organs than all prior art. Organs such as the bladder which have shown great response to cooling to provide pain relief to patients suffering from pelvic maladies such as interstitial cystitis. Additionally, organs such as the prostate gland are also to benefit from this simple, thermal delivery system.

The device is also capable of continued reuse due to the ability to be easily sanitized using simple soap and water, mild bleach or alcohol solutions, or autoclaved for sterilization cycles and completely hermetically sealed from such procedures.

The existing devices as compared to the device according to the present invention suffer from the following defects:
1) The amount of heat the device can absorb and release in contact with live tissue is limited. Because the volume of cooling mass is small (less than 100 ml) so is the effective potential therapy impartment. This limited volume cannot maintain a constant thermal influence and recover the higher or lower thermal differences without removing device to re-energize in a cooling or heating disconnected source. Hence the useful period of application is corresponding small, amounting to only a few minutes of steady state application.
2) The cooling rates of present devices are not controllable since they depend solely on the initial temperature of the freezer. The heating rates of present devices are not controllable since they depend solely on the initial temperature of the source of heating of stand-alone devices.
3) In most cases cooling the treatment device is done in the domestic freezer usually containing food provoking negative association. Typically, these treatment devices are extremely painful to apply to traumatized highly sensitive anal-perineal-pelvic floor injured and sensitized tissues. Repeated freezing and defrosting may also crack the walls of the insert portion of the treatment device and thereby would be dangerous to the soft tissue of the rectal or vaginal lumen.

Applying warm and/or cold (contrast therapy) to inflamed or irritated areas of the human body as a therapeutic treatment is well known. For example, ice packs may be applied to a sprained ankle to reduce swelling, or a container filled with warm water may be applied to a sore back to help loosen and relieve the back muscles. The potential effectiveness of a warm or cold treatment increases as the level of control for the treatment increases. In particular, for injuries to the regions of swollen hemorrhoidal, perineal, vaginal and prostate, the effectiveness depends on the ability to control the applied temperature, applied pressure, and gentleness of local application of duration and therapy applied to the injured surface area in direct contact. Due to the extreme nerve sensitivities brought about by, for example, a swollen hemorrhoidal flare up condition, if the density, hardness or durometer and/or other features of currently used methods are too great when applied to the areas of focus, the level of discomfort can be so high as to render the effective utilization of current methods unacceptable. Therefore, a method for more precisely controlling the temperatures and pressures over a longer period of time than all previous efforts of prior art, while maximizing the area of contact are applied to said region of interest with least amount of pain and discomfort are highly desirable.

The probe element of the pelvic cavity thermal delivery device may be operable to impart a desired therapy temperature to the human interface device, expanding a membrane which may contain a therapy fluid and which may be applied to the therapy site or probe or pelvic cavity of the therapy recipient. The therapy recipient may also interface via a remote-control device. The therapy recipient may also control the temperature of the fluid therapy delivery using the reservoir to hold the therapy fluid at chosen temperatures, either warm or cold. As non-limiting examples, the therapy fluid may be water or other human-contacting benign fluids. The probe element of the pelvic cavity thermal probe delivery device may be designed to optimally deliver and temperature of the therapy fluid that circulates through the membrane to the therapy site.

The temperature of the reservoir may be controlled by various mechanisms. In some embodiments, the cold reservoir may be adapted to receive ice that may melt in the cold reservoir, thus decreasing the temperature of the fluid in the cold reservoir. A receptacle has a reservoir aperture that may be suitable for easily receiving ice. In some embodiments, the cold reservoir may include a cooler for cooling the fluid held in the cold reservoir. It is within the scope of the invention to use virtually any other suitable method for cooling the fluid held in the reservoir. The cold reservoir may include insulation to limit heat transfer between the fluid held by the cold reservoir and the external environment.

The temperature of the fluid in the reservoir may usually be limited to approximately 32.5 to 45 degrees Fahrenheit, although such a limitation is not necessary. In particular, it has been found that a temperature of about 35 to 42 degrees Fahrenheit is an appropriate minimum temperature. Although water is usually used as the fluid, it is within the scope of the invention to use other suitable fluids. Such fluids may be selected for particular applications based on their specific heat, viscosity, freezing point, or combinations thereof.

The human interface device may be an enclosure for the membrane, a transfer port, and other components of the probe element of the pelvic cavity thermal probe delivery device. The human interface device may comprise the membrane, a sit surface, the transfer port, and a plurality of voids. The human interface device may be adapted for the therapy recipient to place the therapy site adjacent to the membrane. As a non-limiting example, the human interface device may be adapted for the therapy recipient to sit upon the sit surface such that the membrane is directly below the therapy site. As a non-limiting example, the sit surface may be a top surface of the human interface device. The sit surface may be contoured to complement the therapy site. In some embodiments, the sit surface may be heated and/or cooled. In some embodiments, portions of the human interface device may be fabricated from a lattice of elastomeric polyurethane such that the human interface device provides intrinsic airflow at the dermal surfaces, cushioning and suspension. As a non-limiting example, the sit surface may be fabricated from a lattice of elastomeric polyurethane.

The membrane may be an expandable interface between the human interface device and the therapy site. The therapy fluid may flow into and out of the membrane via fluid transfer openings. The membrane may expand due to pressure from the therapy fluid and may conform to contours of the therapy site. Heat may transfer through the membrane, either from the therapy fluid to the therapy site or from the therapy site to the therapy fluid, such that the therapy site may be warmed or cooled.

A membrane void in the human interface device may be dimensioned to retain a space for the membrane. However, the volume of the membrane may be controlled by changing a power level, and thus the pumping pressure, from 10% to 100% via the remote-control device. Furthermore, the membrane may be constructed from various appropriate, sanitary flexible materials, such as polyisoprene, urethane, silicone or latex rubber, which may permit a membrane expansion in response to the pressure of fluid within the membrane.

The membrane may stretch and naturally return to an unstretched disposition. When stretched, the membrane is at an increased tension, which may be used to contact directly under pressure around the therapy site.

The transfer port may be an interface between the membrane and the fluid tubing. The transfer port may simplify the interconnection of the fluid tubing to the membrane. In some embodiments, the transfer port may comprise one or more transfer port to hid interfaces for coupling the transfer port to the membrane.

In some embodiments, the transfer port may comprise a thermostat for sensing the temperature of the therapy fluid as part of the control system. The thermostat may communicate the temperature of the therapy fluid to a power supply, to the pump, to mixing valves, or combinations thereof such that an adjustment to the temperature and/or the power level may be made in order to keep the therapy fluid at a pre-set temperature. As a non-limiting example, the thermostat may be designed to receive manual input of a desired therapy temperature and adjust the mixing valve to yield the therapy fluid with that temperature. Accordingly, the thermostat may include a temperature measuring device such as a thermistor, thermometer, or thermocouple. The temperature measuring device may monitor the temperature of the therapy fluid as the thermostat adjusts the mixing valve to yield the desired therapy temperature. The temperature measuring device may cooperate with a temperature display to present the temperature of the therapy fluid. The thermostat may be programmable to automatically change the therapy temperature at a desired time or event by adjusting the ratio of warm and cold fluids delivered from the mixing valve. As a non-limiting example, the thermostat may be programmed to provide alternating warm therapies that last for five minutes at 105 degrees Fahrenheit and cold therapies that last for 5 minutes at 40 degrees Fahrenheit. It should be understood that the thermostat may be programmed for therapies of different durations and/or temperatures.

The plurality of voids may be cavities within the human interface device where components of the probe element of the pelvic cavity thermal probe delivery device may be placed for protection and for concealment. The plurality of voids may comprise the membrane void, a power cable void, a pump containing void, a power supply containing void, a fluid tubing containing void, and a transfer port containing void. The membrane void may be a cavity on the top of the human interface device intended for placement of the membrane. The power cable void may be a cavity on the bottom of the human interface device intended for placement of a power cable. In some embodiments, the power cable void may provide a path for the power cable to run between the power supply containing void and the pump containing void. The pump containing void may be a cavity on the bottom of the human interface device intended for placement of the pump. The power supply containing void may be a cavity on the bottom of the human interface device intended for placement of the power supply. The fluid tubing containing void may be a cavity on the bottom of the human interface device intended for placement of the fluid tubing. The transfer port containing void may be a cavity on the bottom of the human interface device intended for placement of the transfer port. The plurality of voids may extend to a side of the human interface device and/or may extend through the human interface device. As non-limiting examples, the fluid tubing containing void may extend to a side of the human interface device such that the fluid tubing may exit the human interface device and the transfer port containing void may extend to the membrane void via the one or more transfer port to hid interfaces.

The fluid tubing may comprise a fluid delivery tube, a fluid return tube, and a pair of couplers. The fluid tubing may transport the therapy fluid between the reservoir and the transfer port. The pair of couplers may detachably couple the fluid tubing to the reservoir. Specifically, the fluid delivery tube may transport the therapy fluid from the reservoir to the transfer port. After the therapy fluid passes through the membrane via the transfer port, the fluid return tube may transport the therapy fluid back to the reservoir. The human interface device may be easily coupled and decoupled from the fluid tubing via the pair of couplers. The pair of couplers may comprise an intake port and an outflow port. The intake port and the outflow port may detachably couple the fluid tubing to bulkhead ports located on a coupling assembly. The intake port may terminate the fluid delivery tube and may detachably couple the fluid delivery tube to the coupling assembly. The outflow port may terminate the fluid return tube and may detachably couple the fluid return tube to the coupling assembly.

Expansion of the membrane may facilitate thermal exchange between the therapy site and the therapy fluid. As a non-limiting example, when a cold therapy is administered, heat from the body of the therapy recipient may heat the therapy fluid, which in turn cools the therapy site. Similarly, when a warm therapy is administered, the therapy fluid may transfer heat to the therapy site. The therapy may be enhanced by moistening the membrane to provide a moist therapy. Furthermore, the fluid may also be pulsed through the membrane, adding a therapeutic massage aspect to the therapy site. In this therapeutic example, acoustical energy may also be focused into the membrane via the delivery fluid contained within the human interface device in order to improve erectile venous blood flow. Furthermore, usage of ergonomically humancentric anal and vaginal cavity devices, utilizing over molded/integrated thermally transmissive devices known commonly as heat pipes, may deliver pumped fluid thermal energy to internally located devices via the membrane supported by the human interface device (HID).

Fluid paths described herein may utilize flexible tubing or may alternatively implement another suitable fluid transport mechanism. As a non-limiting example, some or all of the fluid paths may alternatively be defined by inflexible fluid conduits. The fluid paths may include filters, flow restrictors, and/or check valves. Filters may help prevent flow blockages resulting from jammed ice or other substances, and check valves may be used to prevent backflow in the system. The rate of fluid flow may be at least partially controlled by flow restrictors or the power level setting of the pump.

The intake port and the outflow port may each include one male valve and/or one female valve, which are configured to mate with a corresponding female and/or male valve. The human interface device may be easily coupled and decoupled from the fluid tubing.

The pump may circulate the therapy fluid through the probe element of the pelvic cavity thermal probe delivery device. The pump may be positioned in several locations along the fluid tubing. As a non-limiting example, the pump may be positioned within the pump containing void. Alternatively, the pump may interpose the mixing valve and the bulkhead output. In some embodiments, more than one pump may be utilized. The pump may be integrated into a reservoir lid of the reservoir. The pump may be powered according to the desired application. In a preferred embodiment, a pump therapy fluid capacity may be sized to be most effective for the condition to be treated. The pump may be a reciprocating pump, a rotary pump, or virtually any other suitable pump.

In some embodiments, the pump may be configured to pulse the therapy fluid through the therapy human interface device. Such a pulsing action may be translated into a therapeutic massage at the therapy site via the human interface device. As the pulsing fluid circulates through the human interface device, the membrane may pulsate due to varying pressure. Pumps designed to pulse fluid may be further enabled to adjust the relative magnitude of the pulsing to correspond to different intensities of therapeutic massages. The relative intensity of the pulsations may be automatically or manually coordinated to correspond to a particular temperature of treatment. As a non-limiting example, a vigorous massage may be applied during a warm treatment while a milder massage is applied during a subsequent cold treatment.

Use of the probe element of the pelvic cavity thermal probe delivery device may include circulating the therapy fluid with the initial therapy temperature through the human interface device. The therapy fluid may be circulated in a pulsing stream, so as to impart a vibration that is useful in providing a therapeutic massage. Of course, the flow may instead be smooth. Use of the probe element of the pelvic cavity thermal probe delivery device may include applying the human interface device to the therapy site on the therapy recipient. The temperature of the therapy fluid may be translated through the fluid tubing to the membrane. As a non-limiting example, if the initial temperature of the therapy fluid is relatively warm, for instance 110 degrees Fahrenheit, the human interface device may be used to heat the therapy site on the therapy recipient. Similarly, the therapy fluid with a relatively cold therapy temperature, such as 40 degrees Fahrenheit, may be used to cool the therapy site. The human interface device may be applied to the therapy recipient by using the membrane to compress the human interface device against an injured therapy site.

Use of the probe element of the pelvic cavity thermal probe delivery device may further include returning the therapy fluid to at least one of the volumes of warm fluid and the volume of cold fluid. Returning the therapy fluid to either or both of the volumes of warm and cold fluids allows the therapy fluid to be recycled. A returned fluid may then be heated and/or cooled, and eventually may be recirculated to the human interface device. In this manner, a limited volume of fluid in a system may be used to provide an ongoing therapy. The fluid may be repeatedly heated and/or cooled, and thus the character of the treatment may be continually changed.

Use of the probe element of the pelvic cavity thermal probe delivery device may also include selecting relative amounts of the warm and cold fluids to mix as the therapy fluid with a desired Anal-Perineal-Prostate-Vaginal-Pelvic Floor contrast therapy temperature different than the initial therapy temperature. By changing the relative amounts of warm and cold fluids, the resulting temperature of the therapy fluid may be changed, which changes the therapy received by the therapy recipient. It is within the scope of the invention to make such temperature changes quickly through the use of quick release fluid couplings. Circulating a thermally contrasting fluid with the probe element of the pelvic cavity thermal probe delivery device allows the therapy recipient to experience a cold treatment immediately after a warm treatment or a warm treatment immediately after a cold treatment. It should be understood that the period of change between respective treatments is ideally very small, such as under two minutes. This process may be repeated one or more times, and each time the relative amounts of the power level delivering greater or lesser volumes and resultant pressures to injured tissues/muscles of warm and cold fluids may be selected to result in a desired therapy temperature.

The reservoir may hold the therapy fluid. The reservoir may comprise the receptacle and the coupling assembly. The receptacle may be a cylindrical container with the reservoir aperture at the top. The coupling assembly may comprise the reservoir lid and the bulkhead ports. The coupling assembly may selectively couple and decouple the fluid delivery tube and the fluid return tube. The reservoir lid may cover the receptacle and may seal the receptacle to prevent leakage of the therapy fluid. The bulkhead ports may couple to the intake port and the outflow port such that the therapy fluid may be drawn from and returned to the reservoir.

The reservoir may be dimensioned to hold virtually any volume of the therapy fluid. As a non-limiting example, the receptacle may hold one liter of the therapy fluid. When increased thermal stability is desired, the reservoir may be larger than one liter to provide an increased capacity for the therapy fluid.

The reservoir may be designed to hold a warmed thermal fluid of approximately 100 to 118 degrees Fahrenheit. Pressure from the therapy fluid flowing through the membrane may stretch the membrane such that the membrane conforms to the contours of the therapy site. The therapy fluid in the reservoir may be heated by a heater that is incorporated into the reservoir or the therapy fluid may be brought to temp elsewhere using an external heat source and then placed into the reservoir. The reservoir may be thermally insulated to retain the temperature of the therapy fluid as long as possible.

In some embodiments, the reservoir may be a single component used for both cold fluid therapy and warm fluid therapy. In some embodiments, a cold fluid reservoir and a warm fluid reservoir may be provided and may have differentiated features and sizes. As a non-limiting example, the warm fluid reservoir may comprise the heater which the cold fluid reservoir does not provide.

The flow rate of fluid through the warm reservoir may correspond to the temperature of treatment being applied, with greater flow rates occurring during desired warmer treatments due to some thermal losses of exposed tubing to the ambient environment. During some warm treatments, the heater may have limited time to increase the temperature of the fluid because the fluid quickly passes through the warm reservoir. For this reason, the heater may be powered so as to increase the temperature a desired amount within that constrained timeframe. However, the heater does not need to completely heat the fluid from a minimum temperature to a maximum temperature in such a timeframe, although it is within the scope of the invention to do so. The therapy fluid may cool in the process of being pumped from the reservoir to the membrane and through the therapy site but may return to the reservoir while still at a temperature that is above the starting temperature of the therapy fluid. The starting temperature of the therapy fluid is defined to be the temperature of the therapy fluid that was placed into the reservoir. Thus, the net temperature of the fluid may incrementally increase as it repeatedly circulates through the reservoir. The maximum temperature of the fluid in the reservoir may be limited to approximately 100 to 115 degrees Fahrenheit, although such a limitation is not required. In particular, it has been found that a warming temperature of about 105 degrees Fahrenheit may be optimal for warm fluid therapy.

The power supply may provide power to operate the probe element of the pelvic cavity thermal probe delivery device. As non-limiting examples, the power supply may provide power for the heater, the cooler, the pump, the thermostat, and a display. In some embodiments, the power supply may utilize alternating current, while in other embodiments, the power supply may utilize direct current. Some embodiments may be configured to operate with either AC or DC power. As a non-limiting example, the probe element of the pelvic cavity thermal probe delivery device may include a DC heater and pump designed to draw power from either a battery or an electrical outlet via an AC/DC converter. Batteries used to power the probe element of the pelvic cavity thermal probe delivery device may be externally connected to the system, and/or housed within the system. The probe element of the pelvic cavity thermal probe delivery device may be powered from alternative power sources as well. As non-limiting examples, the probe element of the pelvic cavity thermal probe delivery device may be powered by a rechargeable battery pack, an automobile battery via an automotive cigarette lighter jack, a USB Port, solar panels, or from a generator.

The power supply may comprise a signal receiver. The signal receiver may receive a signal that is transmitted by the remote-control device. The signal receiver may be operable to turn power to the human interface device on and off. The signal receiver may be operable to change the power level of the power supply.

The remote-control device may provide a power level interface and may remotely adjust the fluid speed and pressure delivered by the pump. The remote-control device may be adapted to be used by an operator. As non-limiting example, the operator may be the therapy recipient or a therapist. The power supply, the remote-control device, and the pump may comprise a control system that regulates the maximum flow rate and/or temperature of the therapy fluid in the reservoir. The control system may also be designed to maximize thermal efficiency to limit energy requirements.

The operator may interact with the power level interface of the remote-control device and command the remote-control device to send a wireless message to the probe element of the pelvic cavity thermal probe delivery device that establishes the power level for the pump. The power level may indicate a relative magnitude of a desired therapy pumping pressure. As a non-limiting example, the power level interface may include a series of icons representing relative percentages of pressure from 10% to 90%. As non-limiting examples, the signal communicated between the remote-control device and the signal receiver may be based upon an RF or IR carrier and may be modulated to convey a specific command.

In some embodiments, the remote-control device may be a smart device. As non-limiting examples, the smart device may be a smartphone, iPad, tablet computer, smart watch, laptop computer, or other handheld devices with an internal processor and communication capability (transmit and receive).

In some embodiments, the human interface device may comprise a diverter. The diverter may direct the therapy fluid to the sit surface such that the sit surface may be heated and/or cooled.

The method of using the probe element of the pelvic cavity thermal probe delivery device may comprise placing the therapy site against the human interface device, pumping the therapy fluid from the reservoir, through a membrane of the human interface device, and back into the reservoir, expanding the membrane against the therapy site, and exchanging heat between the therapy fluid and the therapy site via the membrane.

The method of using the probe element of the pelvic cavity thermal probe delivery device may further comprise heating the therapy fluid to a temperature in the range of 100 to 118 degrees Fahrenheit. Heating the therapy fluid may be done as a separate step prior to filling the reservoir or may be done by the heater within the probe element of the pelvic cavity thermal probe delivery device.

The method of using the probe element of the pelvic cavity thermal probe delivery device may comprise cooling the therapy fluid to a temperature in the range of 32.5 to 45 degrees Fahrenheit. Cooling the therapy fluid may be done as a separate step prior to filling the reservoir or may be done by the cooler within the probe element of the pelvic cavity thermal probe delivery device.

The method of using the probe element of the pelvic cavity thermal probe delivery device may comprise alternately heating and cooling the therapy fluid such that the temperature of the therapy fluid fluctuates above and below the internal body temperature of the therapy recipient. Alternately heating and cooling the therapy fluid may be done by switching between multiple reservoirs having different temperatures or by using the heater and the cooler within the probe element of the pelvic cavity thermal probe delivery device to vary the temperature of the therapy fluid.

The method of using the probe element of the pelvic cavity thermal probe delivery device may further comprise varying the flow rate of the therapy fluid. Varying the flow rate of the therapy fluid may be done manually using the remote-control device or automatically by the pump or the power supply. As a non-limiting example, the power supply may comprise a timer that varies the power level according to a predetermined pattern. Varying or modulating the pressure, or the flow rate, of the therapy fluid may create the sensation of vibration or pulsation to the therapy recipient.

The method of using the probe element of the pelvic cavity thermal probe delivery device may further comprise monitoring the temperature of the therapy fluid and controlling the temperature of the therapy fluid to attain a targeted temperature range. As a non-limiting example, monitoring the temperature of the therapy fluid may be performed by the thermostat sensor. Controlling the temperature of the therapy fluid to attain a targeted temperature range may be performed using the heater, the cooler, and by modulating the flow rate using the power level, or combinations thereof. As a non-limiting example, a prescribed temperature range for the therapy fluid may be established using the remote-control device and the temperature of the therapy fluid may be monitored as the therapy fluid circulates within the membrane of the pelvic therapy element. This element delivers the optimal temperature to the thermal probe delivery device. If the temperature of the therapy fluid is detected to fall below the desired temperature range, the heater may be activated to heat the therapy fluid. If the temperature of the therapy fluid is detected to rise above the desired temperature range, the cooler may be activated to cool the therapy fluid.

As non-limiting examples, controlling the temperature of the therapy fluid to attain a targeted temperature range may be implemented via mixing the output of heating and/or cooling sources.

Turning now to FIG. 1a, is an example of a pelvic cavity thermal probe delivery device in accordance with an embodiment of the present invention. The figure presents an embodiment of the probe element of the pelvic cavity thermal probe delivery device 10. The thermal probe delivery device 10 is designed to allow anatomical retention and insertion stopping point due to pelvic muscle retention responses. As presented herein, the pelvic cavity contrasting or thermal modulation therapy probe delivery device 10 is capable of imparting prescribed and desired therapy temperature fluid to a targeted pelvic cavity area for treatment of disease, injury, or other prescribed treatments.

Figure 1B:
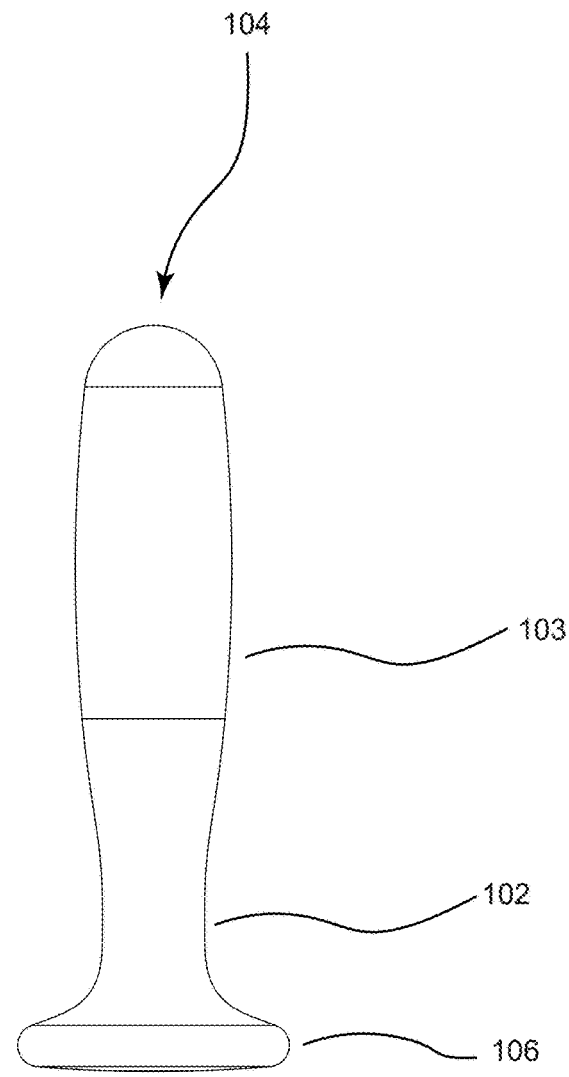
FIG. 1b is an example of a pelvic cavity thermal probe delivery device profile in accordance with an embodiment of the present invention.

Turning now to FIG. 1b, the figure an external view of the pelvic cavity thermal probe. The probe body has a neck down area for pelvic muscle retention 102 to assist the user to hold the probe body within the cavity of the user into which the thermal probe element has been inserted. The probe body also has a portion having a larger diameter for maximizing the surface area of contact 103 when the probe body has been inserted. The probe also has an eternal probe body cap 104. Once inserted into a body cavity the probe body has a probe stop collar surface and radius flange feature stop retainer 106 to limit the depth that the probe body may be inserted into a body cavity.

Figure 1C:
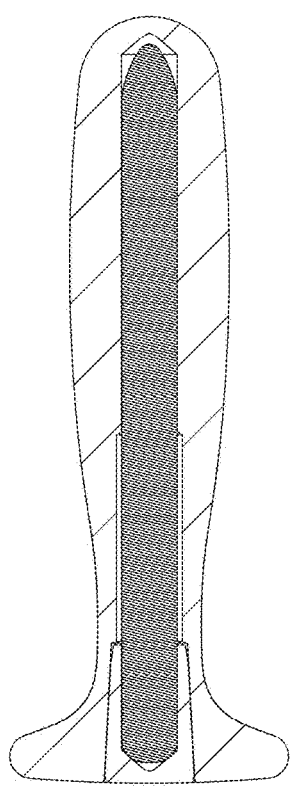
FIG. 1c is an example of a pelvic cavity thermal probe delivery device internal profile in accordance with an embodiment of the present invention.

Turning now to FIG. 1c, the figure is a cutaway, cross-sectional view of an embodiment of the probe element of the pelvic cavity thermal probe delivery device 10. The probe body has a capturing cap seal 11 to retain the heating element within the internal portion of the probe body.

Figure 2:
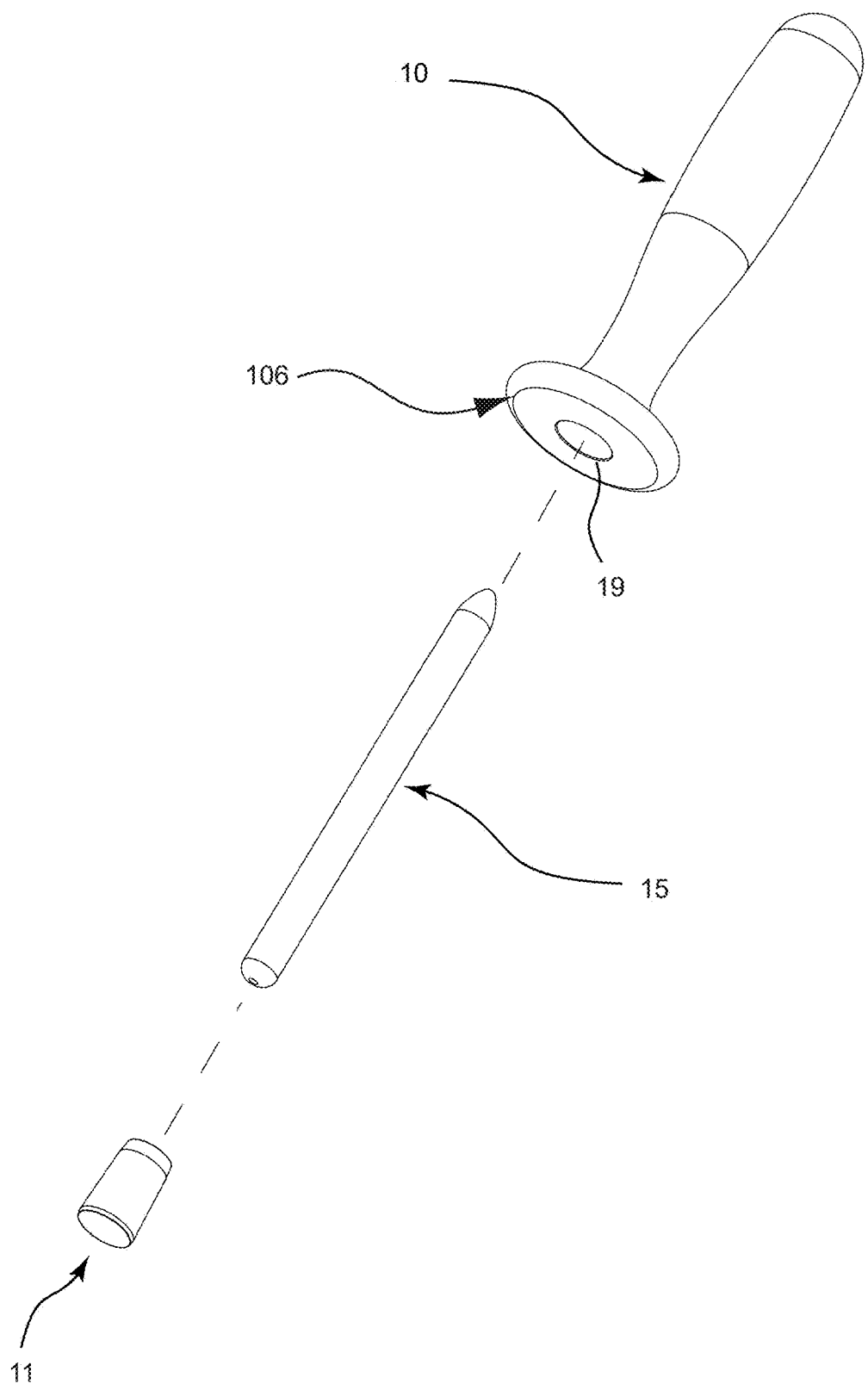
FIG. 2 is an exploded isometric view of a pelvic cavity thermal probe delivery means for administering pelvic cavity thermal-modulation therapy in accordance with an embodiment of the present invention.

Turning now to FIG. 2, the figure presents a pelvic cavity thermal probe delivery device in accordance with an embodiment of the present invention. A side view illustrating an embodiment of the probe element of the pelvic cavity thermal probe delivery device 10 and the insertion of a bi-phase heat pipe 15 into an internal cavity 19 of the thermal probe delivery device 10 is shown. The bi-phase heat pipe 15 is configured to move thermal energy efficiently with a faster transfer rate than a solid mass transfer element. The pelvic cavity thermal probe has an external body shield portion 20 into which the bi-phase heat pipe 15 is designed to be inserted. The bi-phase heat pipe 15 is inserted into the external body shield portion 20 through the heat pipe cavity housing entry point 19 that forms the opening into which the bi-phase heat pipe 15 may be inserted. The capturing seal cap 11 holds the bi-phase heat pipe in place upon insertion. The radius flange feature 106 prevents the thermal pelvic cavity probe from being inserted too far into a body cavity of a user.

The thermal modulation probe assembly 10 may be of various length and width configurations to accommodate human factors, comfort and ergonomics situations. It may contain various versions or configurations of heat pipes and other supporting components of the system working elements.

Turning now to FIG. 3a, is a side view of a depicted pelvic cavity energy delivery system in accordance with an example of a thermal delivery means to the pelvic cavity thermal probe. The figure presents a fluid flow connection from the pump to the energy containment and transfer membrane 32 with the probe assembly 10 attached to the transfer membrane 32. The pump transfers heated and cooled fluids to and from the energy containment and transfer membrane 32 and the associated probe assembly 10 to provide therapeutic treatment.

The thermal fluid holding reservoirs 18 may be dimensioned to hold virtually any volume of fluid, such as, in a non-limiting example, a twin five-liter reservoir of both hot and cold working fluid may be specified and used during thermal therapy treatment. Differently sized reservoirs may be used. In a non-limiting example, when increased thermal stability is desired, fluid holding reservoirs may be supplemented by the use of thermo-electric devices, generically termed Peltier devices, and used when increased thermal stability and control is desired.

Turning now to FIG. 3b, is a detailed isometric view of an example pelvic cavity energy delivery system in accordance with an example of an active thermal delivery means of passive thermal pelvic cavity thermal probe regional interface. The figure presents an isolated view of the energy containment and transfer membrane 32 and the associated probe assembly 10. This configuration is designed to provide the greatest contact with the portions of the user's body that require heating or cooling treatment. The temperature of the probe 10 corresponds to the thermal energy supplied by the thermal energy containment and transfer membrane 32. Thermal delivery and control may be controlled by various mechanisms. It is within the scope of the invention, however, to use virtually any other suitable method for delivering thermal energy to the coupled surface thermal energy wicking contact region 61.

Turning now to FIG. 3c, the figure presents a detailed isometric view of the attachment point for the probe assembly 10 to the energy containment and transfer membrane 32. The view presented is a 4× magnification of a detailed of example pelvic cavity energy delivery system depicting the thermodynamically coupled interface of the probe. Thermal energy is transferred by wicking available energy through the thermal energy transfer coupled surface contact region 61. The attachment point 61 is a wicking thermal contact region to positively couple the probe assembly 10 to the treatment membrane 32 which may be configured as a seat with contours shaped to most advantageously permit a comfortable seating accommodation for a user during treatment.

Turning now to FIG. 4a, is an illustration of the application of the therapy site isolation sleeve and open window as applied to the pelvic cavity thermal probe. This figure presents a view of a site application probe tissue insulating region 42 which assists in insulating the tissues in contact with the probe assembly itself. The tissue insulating region 42 is adjacent to a site application thermally focused open window 45 that permits conduction of thermal energy from the probe assembly to the tissues of a user during treatment.

Turning now to FIG. 4b, is an exploded view of the pelvic cavity thermal probe isolation sleeve as applied to the pelvic cavity thermal probe. This figure presents a view of the insertion of the probe assembly 10 into a site application targeting and insulating sleeve 40. The thermal wicking contact region 61 forms the bottom portion and connection point for the combined probe assembly 10 and the site application targeting and insulating sleeve 40. The insulating sleeve 40 provides a focused open window 45 to permit thermal energy transfer to the user and is configured to be replaceable. The thermal modulation probe assembly 10 may be sleeved with a thermally isolating sleeve 40 with open window configuration 45, where these configurations allow for very focused and locoregional delivery of thermal treatment. The replaceable feature of the insulating sleeve 40 provides the capability to sterilize the insulating sleeve between uses to provide for better cleanliness and to limit the transfer of any unwanted organisms or pathogens.

Turning now to FIG. 5a, this figure illustrates the configuration and utility of the open window of therapy application of the isolation sleeve as applied to the pelvic cavity thermal probe. This figure presents a section view of the pelvic cavity thermal probe isolation sleeve as applied to the pelvic cavity thermal probe. Depicted 15 is the single inserted heat pipe configuration.

Turning now to FIG. 5b, this figure presents a top view of the pelvic cavity thermal probe isolation sleeve.

Turning now to FIG. 5c, this figure presents a side view of the pelvic cavity thermal probe isolation sleeve.

Turning now to FIG. 5d, this figure presents a bottom view of the pelvic cavity thermal probe isolation sleeve.

Turning now to Figure Se, this figure presents an example of the plurality of heat pipe configurations that may be inserted into the thermal probe.

Figure 6B:
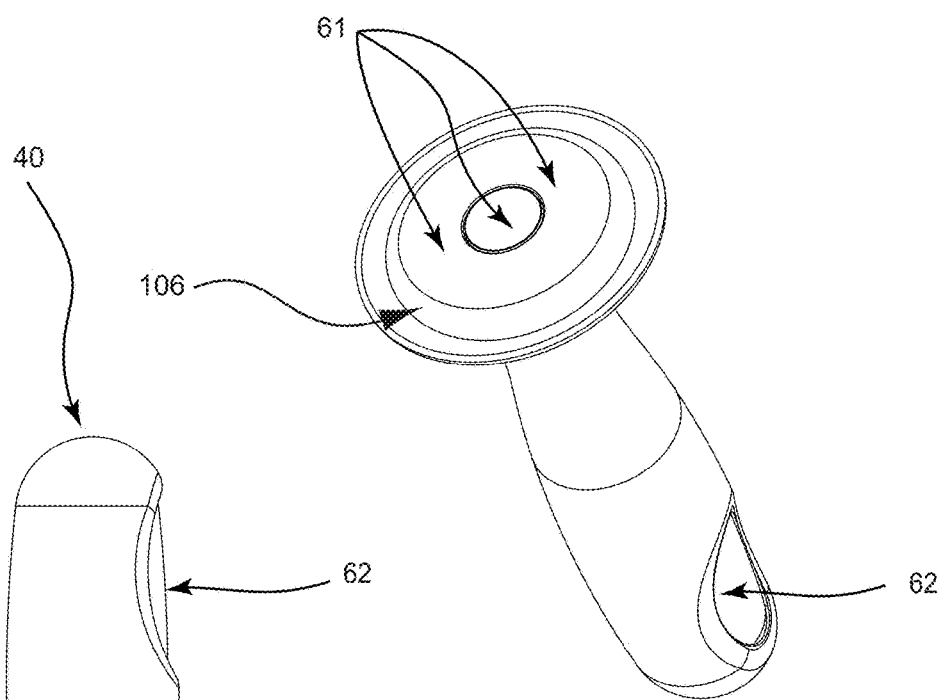
FIG. 6b is presents an isometric view depicting the thermal coupling surface in context with the application of the isolation sleeve as applied to the pelvic cavity thermal probe in accordance with an embodiment of the present invention.
Figure 6A:
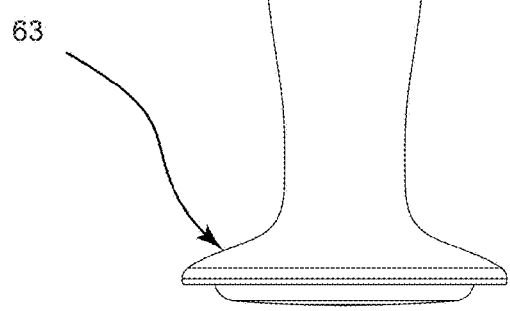
FIG. 6a is a feature depiction of the probe sleeve and thermal application focus element in accordance with an embodiment of the present invention.

Turning now to FIG. 6a, the figure is an illustration of the application of the isolation sleeve as applied to the pelvic cavity thermal probe. This figure presents a side view of the application of the isolation sleeve as applied to the pelvic cavity thermal probe. The isolation sleeve skirt 63 aids to shield thermal influence away from undesired application. The open focus window 62 allows the user/practitioner to focus necessary therapy to locoregional applications such as internal fistulas, tumors or cysts.

Turning now to FIG. 6b, this figure presents an isometric view depicting the thermal coupling surface 61 in context with the application of the isolation sleeve as applied to the pelvic cavity thermal probe when providing therapeutic heating for certain conditions such as tumors, fistulas and or cysts. In a plurality of studies, tumors have been shown to respond more positively to radiation therapy when supporting hyperthermia applications induce a higher oxygenated blood-perfused environment. Additionally, it may be seen that for situations such as anorectal glandular infections or fissures that develop, they respond more positively to the increased oxygenated perfused states in an effort to help heal very challenging locoregional disease states.

Figure 7:
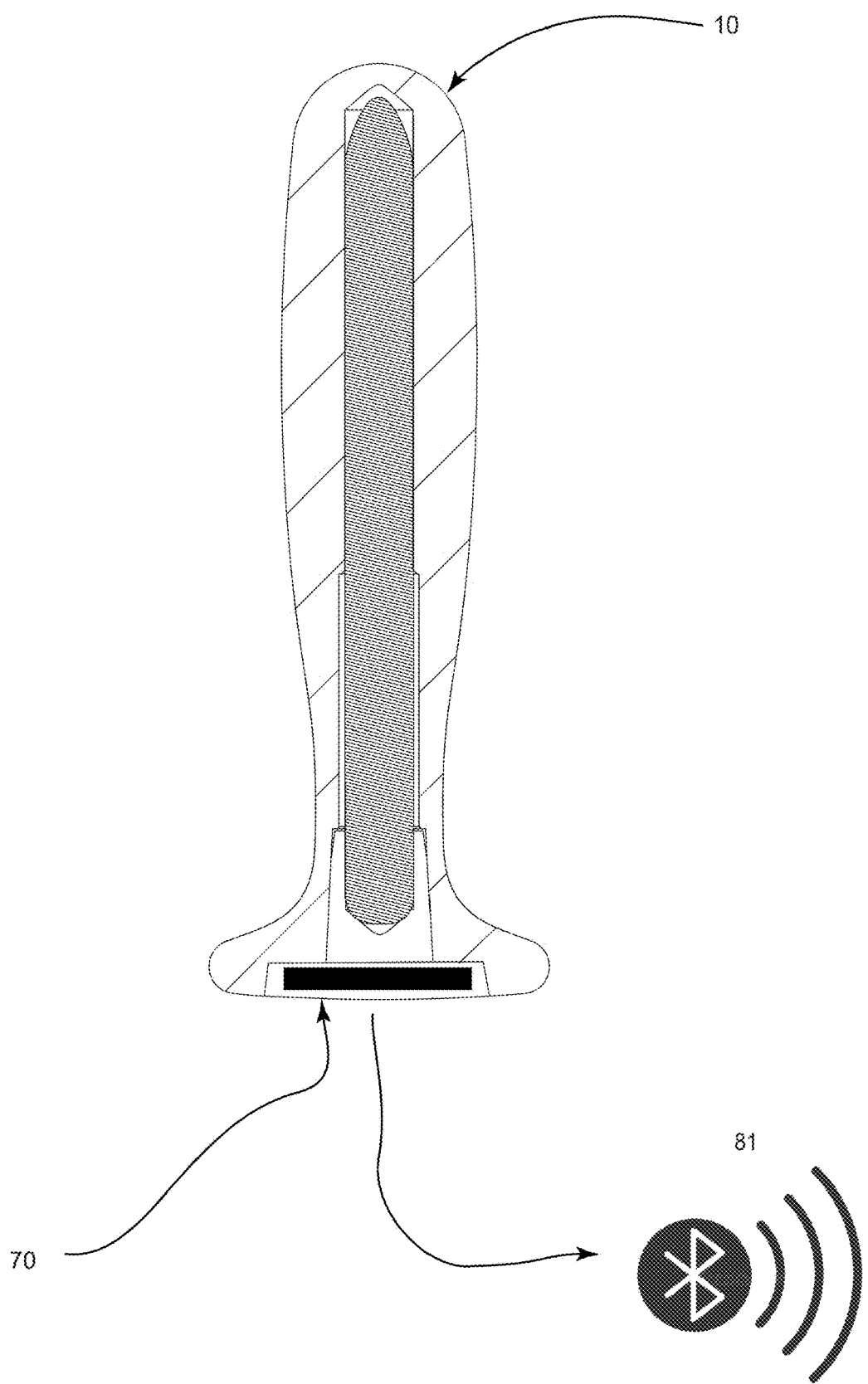
FIG. 7 presents a section view of the pelvic cavity thermal probe illustrating the incorporation of a miniature WiFi transmitter/receiver and power source in accordance with an embodiment of the present invention.

Turning now to FIG. 7, this figure is a section view of the pelvic cavity thermal probe illustrating the incorporation of a miniature WiFi transmitter/receiver and power source 70 as applied to the pelvic cavity thermal probe. The figure presents a control system of the probe assembly 10 having a wireless transmitter/receiver electronic module 81 that may communicate sensed conditions to a computing device, handheld or otherwise, reporting the thermal depth and duration of the affected tissue. The information received regarding the sensed conditions may provide a caregiver with the ability to better design and implement an effective, optimized therapy for the affected tissue.

Turning now to FIG. 8a, this figure illustrates the application of at least one sensor type as applied to the pelvic cavity thermal probe.

Turning now to FIG. 8b, this figure presents a section view of the pelvic cavity thermal probe depicting a combination of miniature WiFi transmitter/receiver and power source and related subsurface mounted sensors as applied to the pelvic cavity thermal probe.

The figure presents an internal view of an implementation of the probe assembly having Thermopiles 80, and/or negative thermal coefficient sensors (NTC) 80 and/or passive microwave radiometers 82 may continually be monitored and shall transmit 81 response data to a data capturing and computational source.

Turning now to FIG. 8c, this figure presents a front view of application of thermal sensor types and addition of tissue depth radiometry sensors and direct thermal surface sensing as applied to the pelvic cavity thermal probe. The figure presents a front view of an implementation of the probe assembly having Thermopiles 80, and/or negative thermal coefficient sensors (NTC) 80 and/or passive microwave radiometers 82 may continually be monitored and shall transmit 81 response data to a data capturing and computational source 81.

Figure 9:
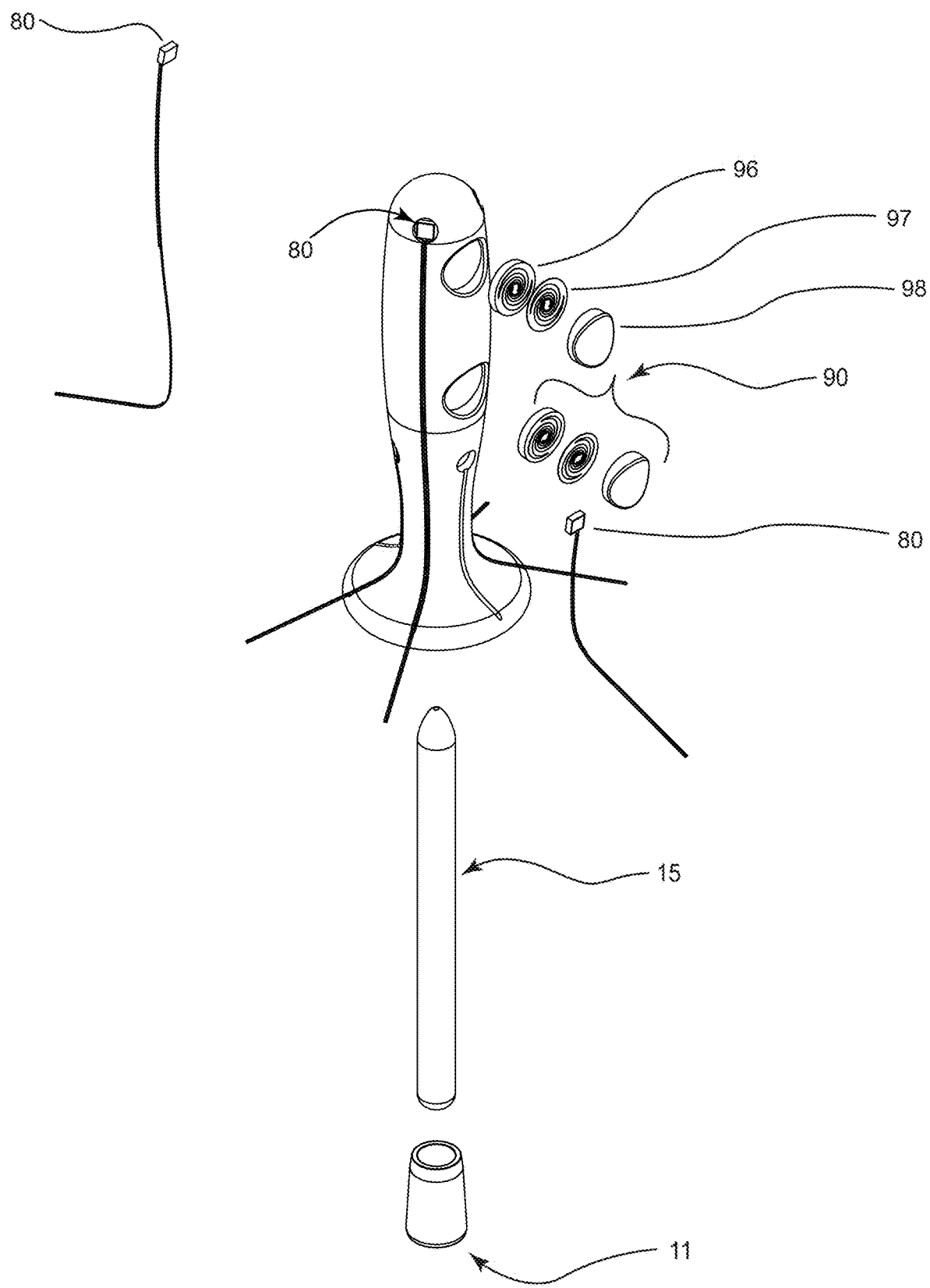
FIG. 9 presents an exploded view of the pelvic cavity thermal probe depicting a combination of miniature WiFi transmitter/receiver and power source and related subsurface mounted sensors in accordance with an embodiment of the present invention.

Turning now to FIG. 9, is an exploded view of the pelvic cavity thermal probe depicting a combination of miniature WiFi transmitter/receiver and power source and related subsurface mounted sensors as applied to the pelvic cavity thermal probe. This figure presents an exploded view depicting the capturing cap seal 11, the bi-phase heat pipe 15, the thermal modulation probe tissue interface body 20, with additional sensing elements ergonomically embedded into a flush fit probe configuration. The primary sensing element 90, being comprised of the base reflector 96, the passive microwave emitter 97 and the flush fit protective window 98. The secondary surface measuring and sensing device being a thermopile or an NTC sensing element 80. The figure additionally depicts the fully assembled ready to utilized instrumented thermal tracking probe. Sensors depicted are not exhaustive of sensor types that may be suitable for other forms of monitoring biological or physical or electrical activity.

Figure 10:
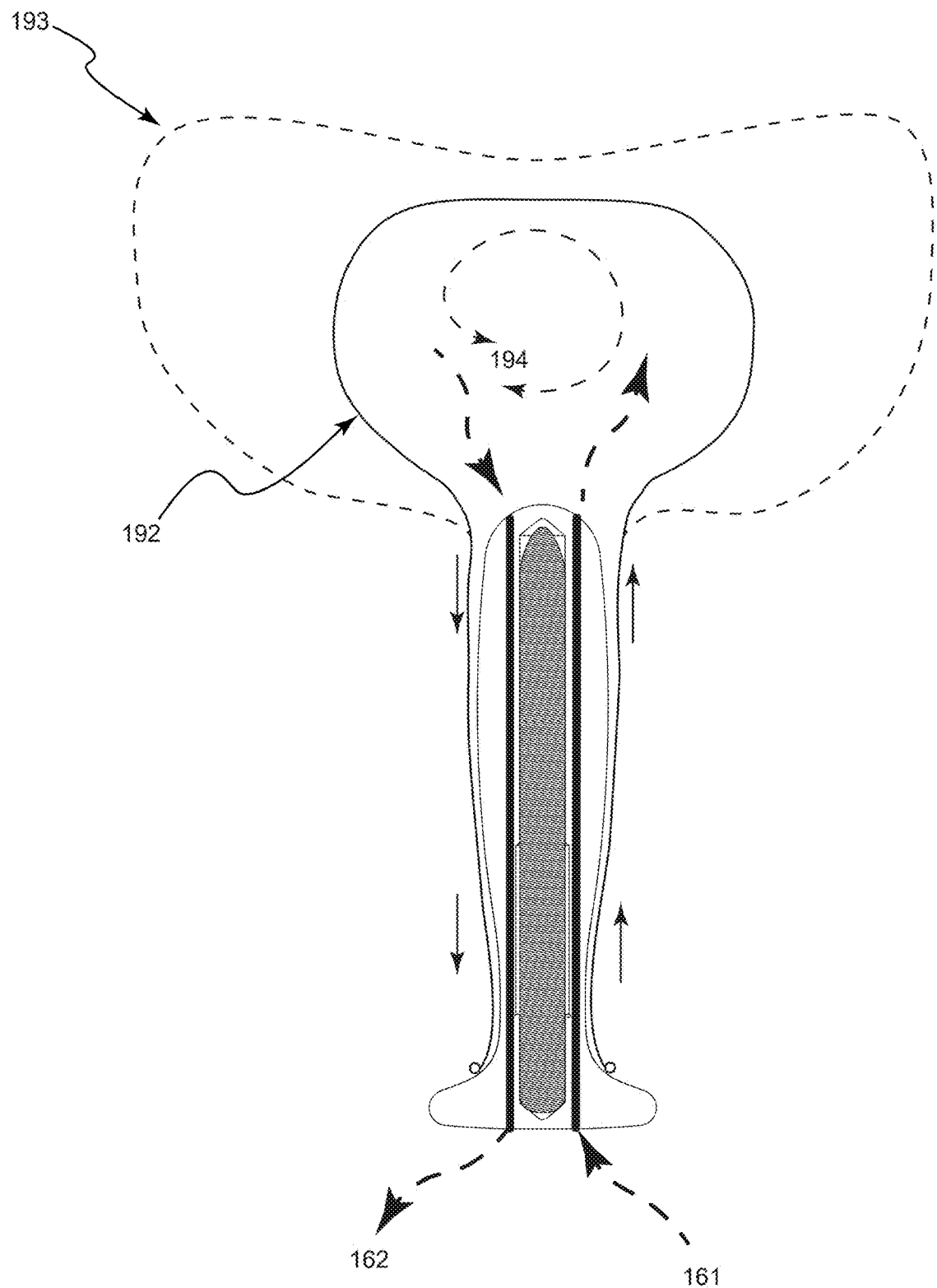
FIG. 10 presents the application of a flexible pelvic cavity balloon cover that expands under fluid pressure ingress into the pelvic cavities by method of active saline fluid delivery in accordance with an embodiment of the present invention.

Turning now to FIG. 10, is a section view illustrating the application of a flexible pelvic cavity balloon cover that expands under fluid pressure ingress into the pelvic cavities by method of active saline fluid delivery via optionally included ports added to the pelvic cavity thermal probe. This figure illustrates a thermal modulation probe assembly 10 that may include a series of vias or ports 161 and 162 to allow for circulating fluid 194 through the system. As illustrated, the fluid reservoir membrane 192. The addition of the expandable membrane 193 shall further allow for a more ergonomic, deeper penetrating and application of the thermal modulation therapy to be applied to internal cavities. Said membrane 192 may also be infused or laced or dressed with any known medicament to be release under the thermal conditions induced by the increase or decrease of the thermal energy. In a non-limiting example, a medicament to treat Candida, Cytolytic Vaginosis, or other bacteria overgrowth, at the locoregional applications of the thermal probe.

Figure 11:
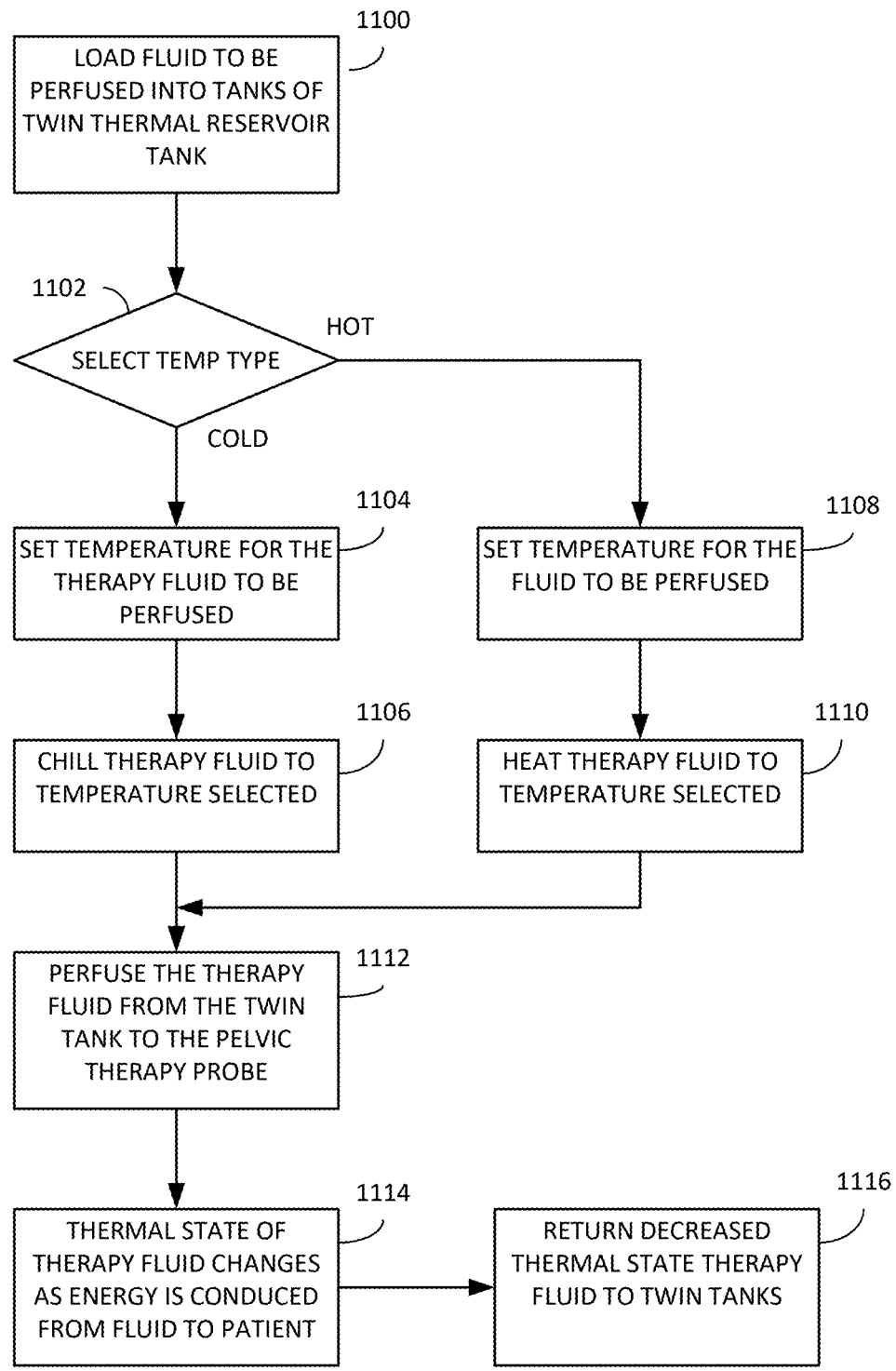
FIG. 11 presents a flow diagram for the safe operation of thermal therapy energy delivery from a thermal probe to one or more mucosal membranes of a user in accordance with an embodiment of the present invention.

Turning now to FIG. 11, this figure presents a flow diagram for the safe operation of thermal therapy energy delivery from a thermal probe to one or more mucosal membranes of a user.

At 1100 a therapist or other medical practitioner may load a fluid having a high thermal transfer capacity that is to be used in a perfusion operation into one or more tanks of the twin thermal reservoir tank, where the perfusion operation moves the fluid from the tank to the pelvic thermal probe and back. At 1102 the therapist or other medical practitioner selects the type of therapeutic operation, either warm or cool therapy, and selects the temperature desired for the delivered treatment. At 1104, if the selection is for cold therapy, the temperature is set for any level below 32.1 degrees Fahrenheit and at 1106 the twin tank is operative to cool the thermal transfer fluid to the desired cool temperature.

If, however, the selection is for warm therapy treatment, at 1108 the temperature is set for warm therapy with a temperature greater than or equal to 125 degrees Fahrenheit and at 1110 the twin tank is operative to warm the thermal transfer fluid to the desired warm temperature. At 1112 the system is initiated and the perfusion of the thermal transfer fluid sends the fluid from the twin tank to the pelvic therapy probe to permit the energy transfer from the thermal transfer fluid to the one or more mucosal tissues of the user undergoing treatment. At 1114 the thermal state of the thermal transfer fluid changes as the energy is transferred from the thermal transfer fluid to the mucosal tissues of the user where the cooling treatment warms the thermal transfer fluid as energy is absorbed from the user's mucosal membranes and where the warming treatment cools the thermal transfer fluid as energy is transferred from the warm thermal transfer fluid to the cooler mucosal membranes of the user. The thermal transfer fluid may thus effect a transfer of thermal energy across the temperature difference gradient to effect either a cooling or a warming of the targeted mucosal membranes in accordance with the design of the therapy required of the user and selected by the therapist or other medical practitioner.

At 1116 after passing by the targeted mucosal membranes of the user, the decreased thermal state thermal transfer fluid is returned to the twin tank to add or subtract thermal energy to return the thermal transfer fluid to the selected temperature to continue either the cooling or warming therapy required by the user and selected by the therapist or other medical practitioner.

While certain illustrative embodiments have been described, it is evident that many alternatives, modifications, permutations and variations will become apparent to those skilled in the art in light of the foregoing description.

I claim:

1. A device for the receipt of active energy and passive thermal transmittance of supplied thermal energy specific to the anal and/or vaginal pelvic mammalian cavities comprising:
   an insertable probe of shape, contour and size for mammalian pelvic cavities;
   said insertable probe composed of a material having rapid passive conduction and dissipation of thermal transmissivity properties;
   said insertable probe having an external body shield portion into which a hermetically sealed heat pipe is fully inserted;
   said insertable probe having a wireless transmitter/receiver and power source embedded and sealed within the base portion of said insertable probe;
   said sealed heat pipe wholly enclosed within said insertable probe and sealed from external contact and energy loss by a capturing seal cap that holds the sealed heat pipe in place upon insertion into said body shield portion of the insertable probe;
   said sealed heat pipe active to deliver thermal energy through said body shield portion to increase a rate of passive thermal energy transmittance and thermal inertia and dissipation when inserted into said body shield portion that comes into contact with internal mammalian mucosa, submucosa, and adventitia tissues;
   said insertable probe coupling thermodynamically with an energy transfer membrane through direct surface contact between the external body shield of said insertable probe and said energy transfer membrane;
   said energy transfer membrane providing a secondary source of thermal energy delivery to the external body shield of said insertable probe.

2. The device according to claim 1, where the insertable probe contour and shape is configured for insertion into a body cavity to place said insertable probe in direct contact with internal mammalian mucosa, submucosa, and adventitia tissues.

3. The device according to claim 1, where the insertable probe material comprises specific coatings or platings, including any of PTFE, Silver, e-Coat, Polyurethane, or silicone materials.

4. The device according to one of claim 1, where said sealed heat pipe is constructed of any of a variety of various thermally advantageous materials including any of high purity coppers (Cu), Silver (Ag), and/or Carbon Loaded Polymers, where said material has a coefficient of thermal intensity of greater than 245 W/m$^2$-K.

5. The device according to claim 1, where said device is operative to transfer thermal energy from a thermal supply source using conductance of energy upon contact with injured or disease sites of the mammalian pelvic cavities;
   where said conductance of energy value is in a thermal range of either cold temperature values not less than 32.1 degrees Fahrenheit (0.055 Celsius) and/or a thermal range of warm temperature values not more than 125 degrees Fahrenheit (51.66 Celsius).

6. The device according to claim 1, where said transfer of thermal energy is transferred to said user by physical contact with the insertable probe within which said active thermal delivery device is embedded.

7. The device according to claim 1, where the device is operative to focus energy to an internally desired specific location through the use of additional sensing elements embedded into the external surface of said body shield portion.

8. The device according to claim 1, where said device is a combination device comprising a body shield portion covering said insertable probe and said insertable probe is embedded or loaded with predetermined medicament loadings.

9. The device according to claim 1, where the device employs any of a plurality of sensors, including any of SaO$_2$ or SpO$_2$ sensors, NTCs, PTCs, thermopiles, and microwave radiometry sensors, where said sensors monitor therapy progress through direct contact with internal, blood perfused mucosa tissues.

10. The device according to claim 1, where the device employs a low energy power supply to energize a miniature WiFi transmitter/receiver, where said WiFi transmitter/receiver communicates utilizing any of BlueTooth, BLE, Zigby, or any other communication protocol providing a local transmitting and receiving capability.

11. The device according to claim 10, further comprising sensors to supply data to machine learning algorithms via said microcontroller WiFI transmitter to transmit real-time information to a receiver or router for consumption by analytic data software.

12. The device according to claim 1, further comprising a compatible isolating thermal sleeve composed of a biocompatible, sterilizable flexible silicone-based material.

13. The device according to claim 12, where the insertable probe enables direct access to the internal tissues, muscles, mucosa, and adventitia of human rectal, vaginal, prostate, cervical, and related anatomical regions;
   where said insertable probe is ergonomically contoured and shaped for insertion of said probe that is not harmful to said internal tissues, mucosa, and adventitia of human rectal, vaginal, prostate, cervical, and related anatomical regions;
   and where said probe is covered by said isolating thermal sleeve to focus the thermal therapy transmission to the unique anatomy of the individual within a known envelope of thermal dosage.

14. The device according to claim 13, where a focus window of said isolating thermal sleeve of the probe contacts one or more internal tissue surfaces and/or regions to transfer and conduct thermal energy away from a thermal fluid external energy delivery source and transmits said thermal energy to the therapy site or target.

15. The device according to claim 1, where the rapid passive conduction and dissipation of thermal transmissivity equal or greater than 112 W/m2-K.

* * * * *